United States Patent [19]

Sugimura

[11] Patent Number: 4,600,035
[45] Date of Patent: Jul. 15, 1986

[54] PULSATION ABSORBING DEVICE INCORPORATING AN INNER CYLINDER PROVIDED WITH SLIDABLE VALVE SHOES

[76] Inventor: Nobuyuki Sugimura, 308, Mabase, Shimizu-shi, Shizuoka-ken, Japan

[21] Appl. No.: 770,797

[22] Filed: Aug. 29, 1985

[51] Int. Cl.[4] .............................................. F16L 55/02
[52] U.S. Cl. ......................................... 138/30; 138/26
[58] Field of Search ................... 138/26, 30; 220/85 B

[56] References Cited

U.S. PATENT DOCUMENTS

| 2,841,181 | 7/1958 | Hewitt et al. | 138/30 |
| 3,744,797 | 7/1973 | Mercier | 138/30 |
| 4,497,388 | 2/1985 | Dexter | 138/30 |

FOREIGN PATENT DOCUMENTS 2149592 3/1973 France .

Primary Examiner—James E. Bryant, III
Attorney, Agent, or Firm—Wood, Dalton, Phillips, Mason & Rowe

[57] ABSTRACT

This pulsation absorbing device is received in a cylindrical pressure vessel includes a cylindrical resilient diaphragm and an inner cylinder formed with a plurality of communicating holes around its wall. It is further provided with one or more slidably movable valve shoes and both of said diaphragm and the inner cylinder are disposed concentrical with each other. One or more arched leaf springs are disposed along the outer face of the inner cylinder and at the place able to cover the communicating holes and are slidably coupled to the inner cylinder by suitable number of pins; and the stroke of the slidable movement given to the pins is made larger than the stroke of the spring motion of said leaf springs, consequently, impinging of the stopper of the pin against the inner cylinder can be avoided, even if the pins may travel being urged by the leaf spring, due to sudden change of fluid pressure in the inner cylinder, over the stroke of the leaf spring.

4 Claims, 5 Drawing Figures

PULSATION ABSORBING DEVICE INCORPORATING AN INNER CYLINDER PROVIDED WITH SLIDABLE VALVE SHOES

BACKGROUND OF THE INVENTION

1. Field of the Invention

This invention relates to a fluid pressure device such as oil hydraulic and hydraulic device, and more particularly to a pulsation damping or absorbing device incorporating therein an inner cylinder having freely movable valve members.

A pulsation damping device comprising such an inner cylinder is provided, at the both axial ends of its cylindrical body proper, with an inlet ring and an outlet ring, a gas chamber, a resilient annular diaphragm and an inner cylinder formed with a plurality of communicating holes, both being concentric one with the other. The inside of the inner cylinder constitutes the passage for pressurized fluid and the device prevents an outbreak of shock wave and/or pulsation in the fluid flow.

In this kind of pulsation damping device as mentioned, however, there is a fear that the resilient diaphragm is liable to be damaged by being forced into communicating holes when it is urged to tightly contact the inner cylinder due to the change in the fluid pressure.

In view of this fact, an effort has been made in the prior art device of this type, as shown in FIG. 5, to provide one or more leaf springs 5 and a resilient valve shoe(s) 6 stacked with each other, between a resilient diaphragm 2 and an inner cylinder 3 and at the place where they can cover communicating holes 4, and these two parts are connected to the inner cylinder by a pin 7 so as to permit slidable movement along the axis of the pin 7 but with its stroke of movement smaller than the amount of stroke caused by elastic deformation of the leaf spring 5 in the direction of the axis of the pin.

According to the prior art device as mentioned above, when the leaf spring 5 is urged by the resilient diaphragm 2 and closes the communicating holes 4, that is, under the condition as shown by a dash line in FIG. 5, if the fluid pressure within the inner cylinder 3 increases, the fluid would flow through the communicating holes 4 in the direction shown by the arrow mark A4 and apply a pressure to the resilient diaphragm 2 and abruptly removes the resilient diaphragm 2 away from the pin 7 and the resilient valve shoe 6 stacked thereto.

The pin 7 and the resilient valve shoe 6 which having suddenly been released from the urging force of the resilient diaphragm 2 will rapidly move, under the resilient force of the leaf spring 5 as well as the fluid force in the direction shown by the arrow mark A4, to the direction shown by the other arrow mark B4 followed by severe impinging of the stopper 8 of the pin 7 upon the inner cylinder 3 accompanying sudden stoppage of the pin 7.

Accordingly, some parts of the device such as the head 7a of the pin 7, the stopper 8 and the resilient valve shoe 6 are apt to be damaged under such impact stress.

SUMMARY OF THE INVENTION

In view of the aforesaid problems, the present invention aims to prevent breakage of the protective member of the resilient diaphragm such as pins and/or resilient valve shoe or shoes.

The present invention is a pulsation absorbing or damping device of the type incorporating within a pressure vessel an inner cylinder provided with a movable valve shoe or shoes which comprises: a cylindrical resilient diaphragm and an inner cylinder formed with a plurality of communicating holes therearound and being concentrically disposed with each other, one or more arched leaf springs disposed along the outer face of the inner cylinder and at the place to cover the communicating holes and are coupled to said inner cylinder by a suitable number of pins so as to be slidably movable, wherein the stroke of the movement of said pins is set to be larger than the stroke of said leaf springs.

The resilient diaphragm within the device being filled with pressurized gas, is urged to move toward the center of the inner cylinder, upon lowering of the pressure of the fluid flowing within the inner cylinder, thereby it urges both the pins and resilient valve shoes and lets the valve shoes to come into close contact with the inner cylinder being interposed by the leaf spring and thus closes the communicating holes.

On the contrary, the pins moves due to both the resilient force of the leaf spring and the fluid force flowing through the communicating holes, upon increase of the pressure of the working fluid.

However, if the pin moves further beyond the spring stroke of the leaf spring, no more resilient force is imparted to the pins, in addition, since each head of the pins abuts together with the resilient valve shoe, the resilient diaphragm, thereby the velocity of the movement is rendered slow down and can be prevented from the severe impinging against the inner cylinder.

DETAILED DESCRIPTION OF THE INVENTION

Figure 1:
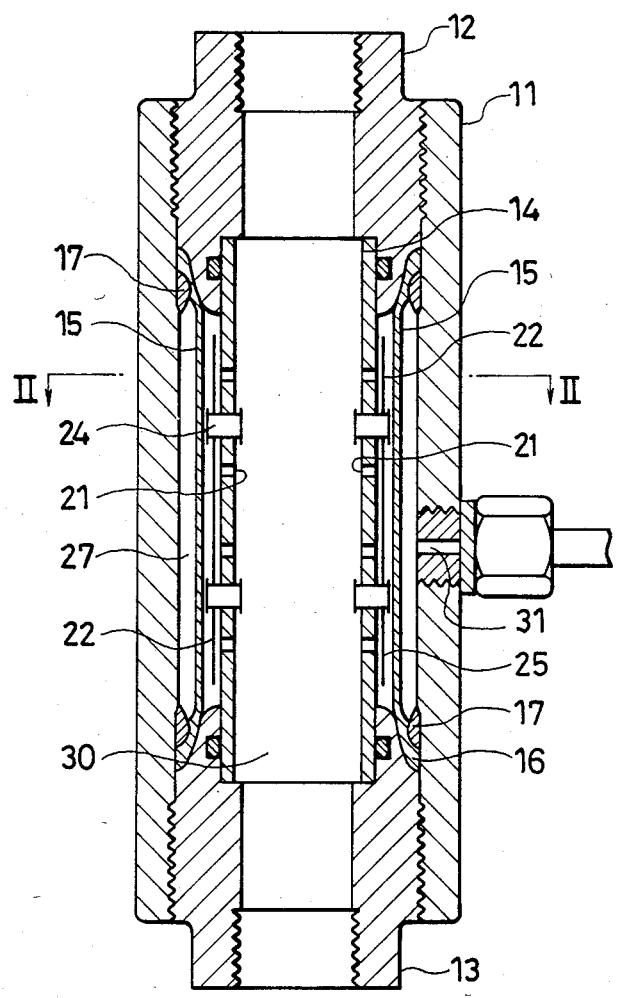
FIG. 1 is a sectional side view showing a preferred embodiment of the present invention.
Figure 2:
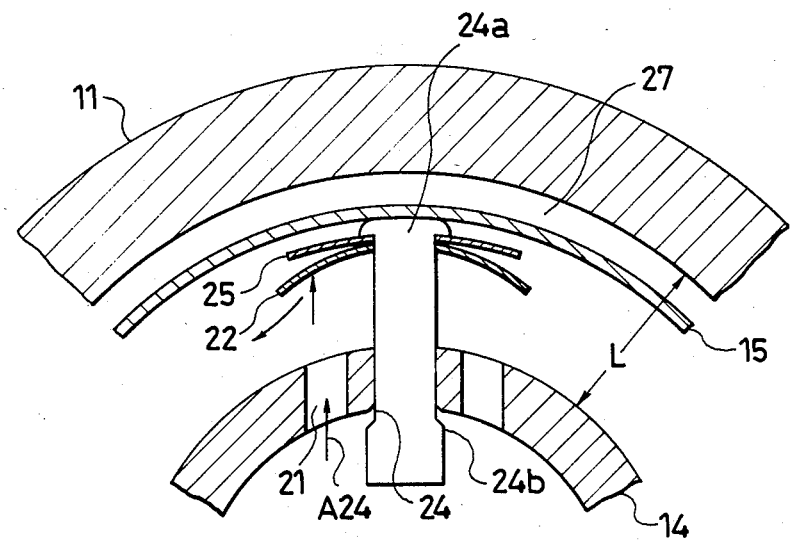
FIG. 2 is a partly enlarged sectional view of the main part of the present invention taken along line II—II of FIG. 4.

Hereafter, explanation will be made on a preferred embodiment of the present invention by referring to the accompanying drawings, FIGS. 1 through 4.

The body proper of the pulsation damping device (hereafter merely be referred to a pressure vessel) 11 comprises; an inlet cylinder 12 at its one axial end and an outlet cylinder 13 at the other axial end thereof, and these two members are threadedly plugged into the pressure vessel and they clamp an inner cylinder 14 from the both axial ends, a cylindrical resilient diaphragm 15 fabricated of an elastomer material such as rubber or the like concentrically disposed with aforesaid members and the flanges 16 at its both axial ends are grasped between one retaining ring 17 and said inlet cylinder 12 and between the other retaining ring 17 and said outlet ring 13, respectively.

Figure 3:
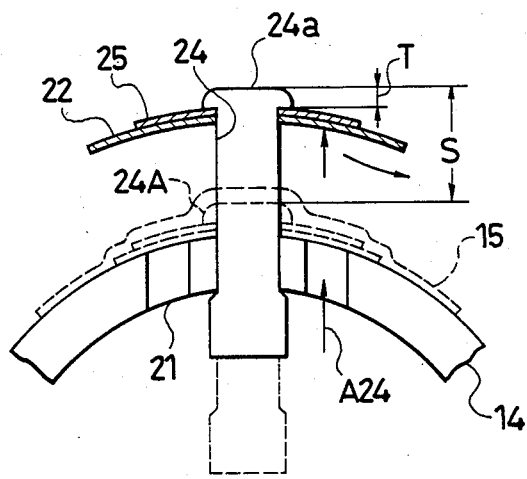
FIGS. 3 and 4 are enlarged sectional view showing another condition of the present invention and FIG. 5 is a sectional side view of the device according to the prior art.

A plurality of communicating holes 21 are formed around and passing through the wall of the inner cylinder 14, and one or more arched leaf springs 22 are disposed between these communicating holes and said resilient diaphragms 15. These leaf springs 22 are coupled to the inner cylinder 14 by a plurality of pins 24 slidably movable in the direction radial to the inner cylinder 14. In addition, a resilient valve shoe 25 is interposed between each leaf spring 22 and the head 24a of the pin 24. The stroke S of the pin head 24a shown in FIG. 3 is made larger than the spring stroke D at the pin head. It is to be noted here that the pin stroke S refers to the entire distance of movement of the pin in its axial direction, while the spring stroke D is meant the distance of pin travel in its axial direction driven by the resilient force of the leaf spring 22.

In the drawing, 24b is a portion formed as a stopper at the rear part of the pin, which upon its engagement with the inner cylinder 14, stops the movement of the pin 24 further toward the resilient diaphragm member.

Numeral 30 in the drawing denotes a fluid passage, and 31 a gas inlet port to introduce a gas such as nitrogen to a gas chamber 27.

Figure 4:
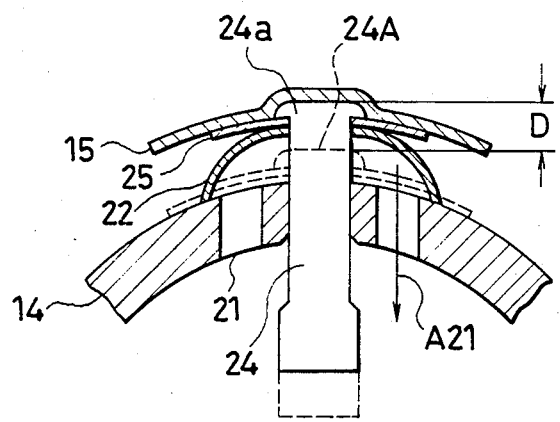
Figure 5:
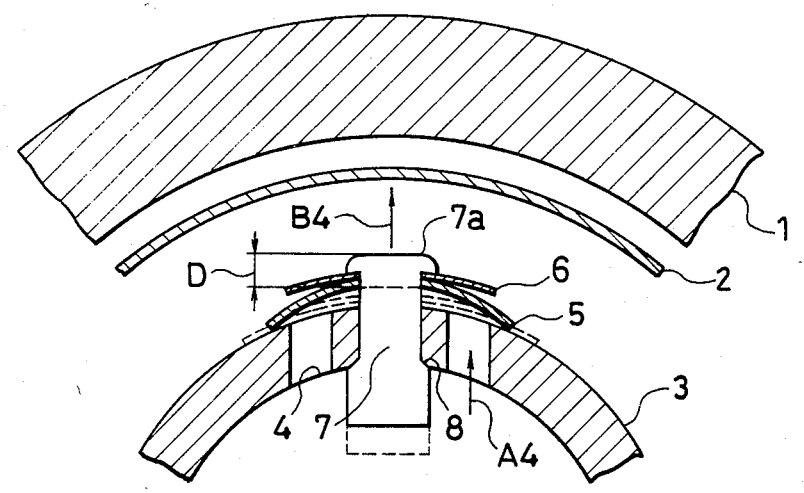

Next explanation will be made on the operation of the present invention, namely, when the pressure of the fluid flowing from the inlet cylinder 12 to the outlet cylinder 13 decreases, thus the resultant relative pressure of the gas in the gas chamber 27 defined between the resilient diaphragm 15 and the pressure vessel 11, becomes higher than that of the working fluid and thereby the resilient diaphragm 15 is urged to be moved toward the center of the inner cylinder 14, and then the fluid will flow in the direction shown by the arrow mark A21 FIG. 4. At the same time, since the heat 24a of the pin 24 will be urged in the same direction by the resilient diaphragm 15, the leaf spring 22 would also move, until it finally comes into close contact with the outer face of the inner cylinder 14, thereby accomplishes complete closing of the communicating holes 21. At this moment, the head of the pin 24 takes its new position as shown in dash line 24A from that shown in solid line in FIG. 4.

On the contrary, when the fluid pressure in the inner cylinder 14 increases higher than that of the gas in the gas chamber 27, the fluid will flow through the communicating holes 21 in the direction shown by the arrow mark A24, thereby it urges the leaf spring 22 outward due to its fluid force, and thereby also urges the pin 24 to move in the same direction. Upon its arrival at the range beyond the spring stroke D, the resilient force of the leaf spring 22 will no more be applied to the pin 24. Then the fluid passage defined between the leaf spring 22 and the outer face of the inner cylinder will be expanded to such an extent as to reduce the fluid force which urges the leaf spring radially outwards, thus the velocity of movement of the pin 24 will also be lowered such that the stopper 24b can moderately engage the inner cylinder 14 and finally let the pin 24 to stop at the portion.

At this instance, the head 24a of the pin takes a position shown by a solid line 24a in FIG. 3 from that shown by the dash line in the same drawing.

It is to be construed that the device of the present invention shall not be restricted only to the embodiments as explained above, but it can include other ways of performing similar function such as by letting a single leaf spring play a role as a valve and spring thereby eliminates resilient valve shoes as mentioned above.

In addition, the stroke 5 can be widened to such an extent as equal to the amount substracting the total sum of, the thickness t of the resilient diaphragm 15, thickness T of the pin head 24a and the thickness of both the resilient valve shoe 25 and the leaf spring 22, from the spacing L (refer to FIG. 2) defined between the outer face of the inner cylinder 14 and the inner face of the pressure vessel 11, thereby to let the pin head 24a to be moderately received by the resilient diaphragm 15 in the course of travelling of the pin 24 in the direction shown by arrow mark A24. (refer to FIG. 2).

As explained above, since the stroke of the pin has been rendered larger than the stroke of the leaf spring, when the pin travels beyond the spring stroke, no more resilient force of the leaf spring is given to the pin, thus the moving speed of the pin will be naturally slowed down.

Consequently, since there is no fear of severe impingement of the stopper 24b of the pin against the stopper 8 of the inner cylinder accompanying a sudden stop, there arises no damage on the protecting means for the resilient diaphragm such as the pin and the resilient valve shoes.

Moreover, if the stroke of the pin be rendered larger than the spring stroke of the leaf spring plus spacing between the inner cylinder and the resilient diaphragm, the pin could be received by the resilient diaphragm and then slowly stopped, so the members suhch as, pins, pin heads, stoppers and leaf springs can be protected in more effective manner.

I claim:

1. A pulsation absorbing device received in a cylindrical pressure vessel, which comprises:
   a cylindrical resilient diaphragm; an inner cylinder formed with a plurality of communicating holes around its wall and provided with one or more slidably movable valve shoes, both of said diaphragm and the inner cylinder being disposed concentrical with each other; one or more arched leaf springs disposed along the outer face of the inner cylinder and at the place able to cover said communicating holes, said springs being slidably coupled to said inne cylinder by a plurality of pins, the. stroke of the slidable movement given to said pins being larger than the stroke of the spring motion of said leaf springs. ! /

2. A pulsation absorbing device incorporating therein an inner cylinder provided with one or more slidably movable valve shoes as claimed in claim 1, wherein said resilient valve shoes are stacked on said resilient leaf springs.

3. A pulsation absorbing device incorporating therein an inner cylinder provided with one or more slidably movable valve shoes as claimed in claim 1, wherein the stroke of said pin is made not more than the length of the spacing defined between the outer face of said inner cylinder and the inner face of said pressure vessel.

4. A pulsation absorbing device incorporating therein an inner cylinder provided with one or more slidably movable valve shoes as claimed in claim 1, wherein said pins are formed with stopper at each inner end thereof.

* * * * *